(12) United States Patent
Lin et al.

(10) Patent No.: US 9,747,299 B2
(45) Date of Patent: Aug. 29, 2017

(54) HETEROGENEOUS STORING SERVER AND FILE STORING METHOD THEREOF

(71) Applicant: Institute For Information Industry, Taipei (TW)

(72) Inventors: Kai-Jyun Lin, Pingtung (TW); Chi-Tien Yeh, Taichung (TW); Fong-Jia Chang, Caotun Township (TW)

(73) Assignee: Institute For Information Industry, Taipei (TW)

( * ) Notice: Subject to any disclaimer, the term of this patent is extended or adjusted under 35 U.S.C. 154(b) by 335 days.

(21) Appl. No.: 14/530,240

(22) Filed: Oct. 31, 2014

(65) Prior Publication Data

US 2016/0103849 A1    Apr. 14, 2016

(30) Foreign Application Priority Data

Oct. 9, 2014  (CN) .......................... 2014 1 0526317

(51) Int. Cl.
 *G06F 17/30*    (2006.01)

(52) U.S. Cl.
 CPC ............................ *G06F 17/30194* (2013.01)

(58) Field of Classification Search
 CPC combination set(s) only.
 See application file for complete search history.

(56) References Cited

U.S. PATENT DOCUMENTS 7,328,260 B1 * 2/2008 Muthiyan ........... H04L 41/0681
                                                       709/220
8,433,848 B1    4/2013 Naamad et al.
8,578,096 B2   11/2013 Malige et al.
2003/0055808 A1 * 3/2003 Bhat ..................... G06F 11/142
2008/0176543 A1 * 7/2008 Gravel ............ G06F 17/30905
                                                       455/414.2
2012/0303929 A1  11/2012 Chiu et al.
2013/0166614 A1   6/2013 Watanabe et al.

FOREIGN PATENT DOCUMENTS

WO     2013098960 A1   7/2013
WO     2014053094 A1   4/2014

OTHER PUBLICATIONS

Office Action to the corresponding Japanese Patent Application rendered by the Japan Patent Office (JPO) on Feb. 23, 2016, 4 pages (including English translation).
Office Action to the corresponding Japanese Patent Application rendered by the Japanese Patent Office (JPO) on Oct. 4, 2016, 6 pages. (including English translation).

* cited by examiner

*Primary Examiner* — Shyue Jiunn Hwa
(74) *Attorney, Agent, or Firm* — Skaar Ulbrich Macari, P.A.

(57) ABSTRACT

A heterogeneous storing server and a file storing method thereof are provided. The heterogeneous storing server has a file storing priority table which records different device type groups. The heterogeneous storing server determines the device type group to which a file belongs according to attributes of the file. The heterogeneous storing server stores the file into appropriate storing devices dynamically and adjusts the number of backups of the file in the storing devices dynamically according to a definition of the device type group.

12 Claims, 16 Drawing Sheets

HETEROGENEOUS STORING SERVER AND FILE STORING METHOD THEREOF

PRIORITY

This application claims priority to Chinese Patent Application No. 201410526317.9 filed on Oct. 9, 2014, which is hereby incorporated by reference in its entirety herein.

FIELD

The present invention relates to a heterogeneous storing server and a file storing method thereof; and more particularly, the heterogeneous storing server and the file storing method thereof according to the present invention dynamically store a file and adjust the number of backups of the file mainly through the priority arrangement.

BACKGROUND

General distributed file systems (DFSs) or technologies mainly use a plurality of nodes connected with storing apparatuses and a file accessing server connected with the nodes simultaneously to access data of the storing apparatuses. After a file is retrieved, most of the file accessing servers firstly determine a storing apparatus having a low utilization factor and directly store the file into this storing apparatus. On the other hand, the retrieved file is usually stored in a fixed number of backups to ensure that, in case a part of the storing apparatuses is corrupted to cause loss of the original file content, the accessing operation can still be accomplished successfully by use of the backups of the file.

However, in order to facilitate maintenance of the system and to maintain the convenience in operation of the system in the conventional DFS architecture, the storing apparatuses connected with the nodes usually need to have the same hardware property and the same accessing speed level. This often makes it impossible to make a compromise between the accessing speed and the hardware cost and leads to a significant decrease in the flexibility in use of the system.

Further, in the conventional DFSs, the number of backups of the file is determined by the system operator early when the system is initiated, so the number of backups cannot be adjusted during the operation depending on the importance level of or the number of accesses to the file. This also leads to a low flexibility in use of the system.

Accordingly, an urgent need exists in the art to overcome the shortcomings of the prior art so as to improve the flexibility in use and the reliability of the system.

SUMMARY

A primary objective of the present invention includes providing a file storing method for a heterogeneous storing server. The heterogeneous storing server is connected to a plurality of storing devices via a plurality of data nodes. The heterogeneous storing server stores a file storing priority table. The file storing priority table records a first device type group. The first device type group has a corresponding first group device attribute. The file storing method comprises: (a) enabling the heterogeneous storing server to retrieve a first file attribute of a file; (b) enabling the heterogeneous storing server to determine that the first file attribute is consistent with the first group device attribute; (c) enabling the heterogeneous storing server to retrieve a first device type of the first device type group according to the result of the step (b); (d) enabling the heterogeneous storing server to select a first storing device from the storing devices according to the first device type; and (e) enabling the heterogeneous storing server to store the file into the first storing device.

To achieve the aforesaid objective, certain embodiments of the present invention include a heterogeneous storing server, which comprises a connection interface, a storing unit and a processing unit. The connection interface is configured to connect to a plurality of storing devices via a plurality of data nodes. The storing unit is configured to store a file storing priority table. Wherein, the file storing priority table records a first device type group. The first device type group has a corresponding first group device attribute. The processing unit is configured to: retrieve a first file attribute of a file; determine that the first file attribute is consistent with the first group device attribute; retrieve a first device type of the first device type group; select a first storing device from the storing devices according to the first device type; and store the file into the first storing device.

The detailed technology and preferred embodiments implemented for the subject invention are described in the following paragraphs accompanying the appended drawings for people skilled in this field to well appreciate the features of the claimed invention.

DETAILED DESCRIPTION

Hereinbelow, the present invention will be explained with reference to certain example embodiments thereof. However, these example embodiments are not intended to limit the present invention to any specific examples, embodiments, environment, applications or implementations as described in these embodiments. Therefore, description of the following example embodiments is only for purpose of illustration rather than to limit the present invention.

In the following embodiments and drawings, elements not directly related to the present invention are omitted from depiction; and dimensional relationships among individual elements in the following drawings are illustrated only for ease of understanding but not to limit the actual scale.

Figure 1A:
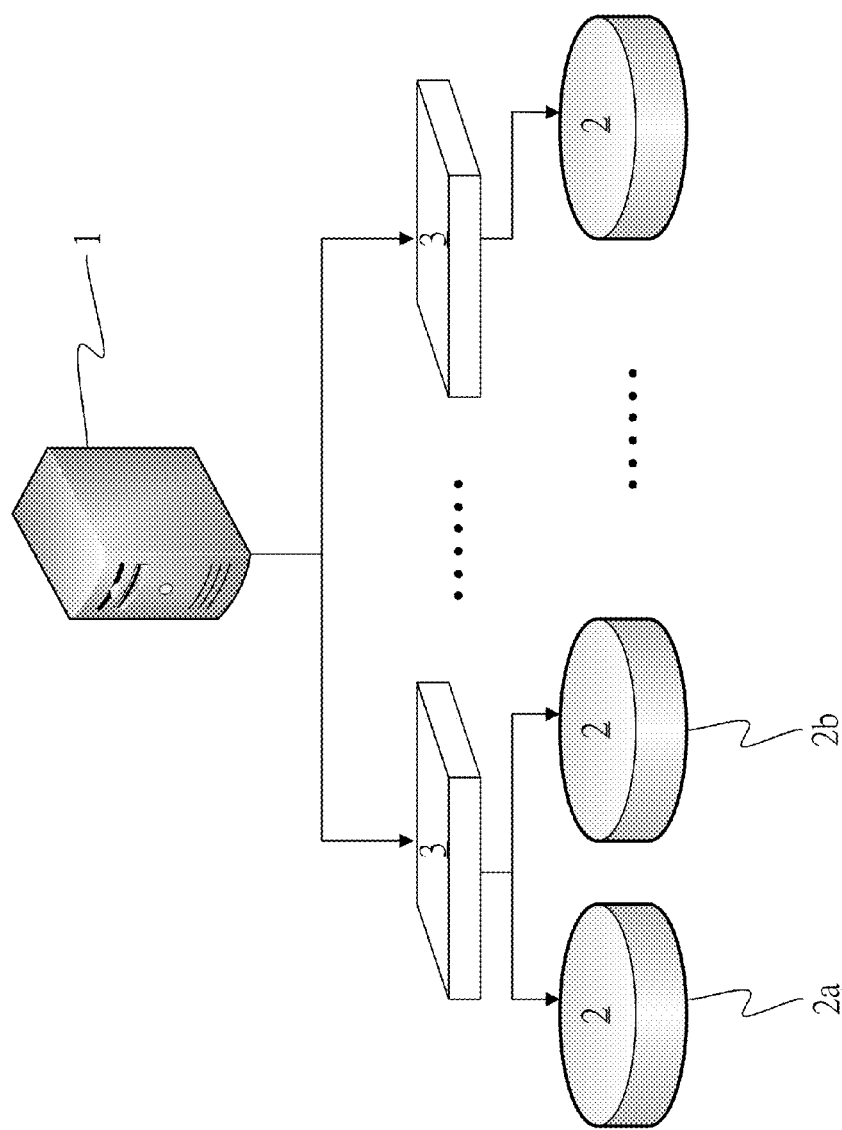
FIG. 1A is a schematic view illustrating an operation environment of a heterogeneous storing server according to a first embodiment of the present invention.
Figure 1B:
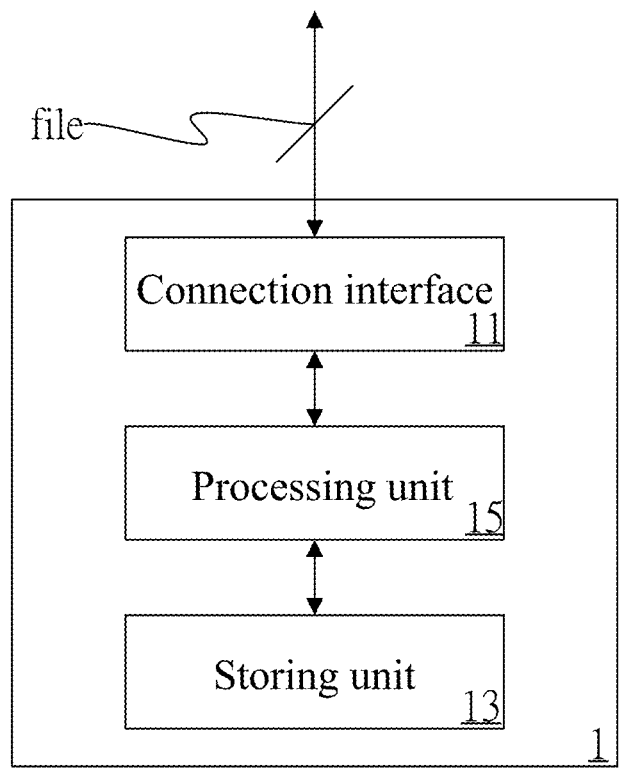
FIG. 1B is a block diagram of the heterogeneous storing server according to the first embodiment of the present invention.
Figure 1C:
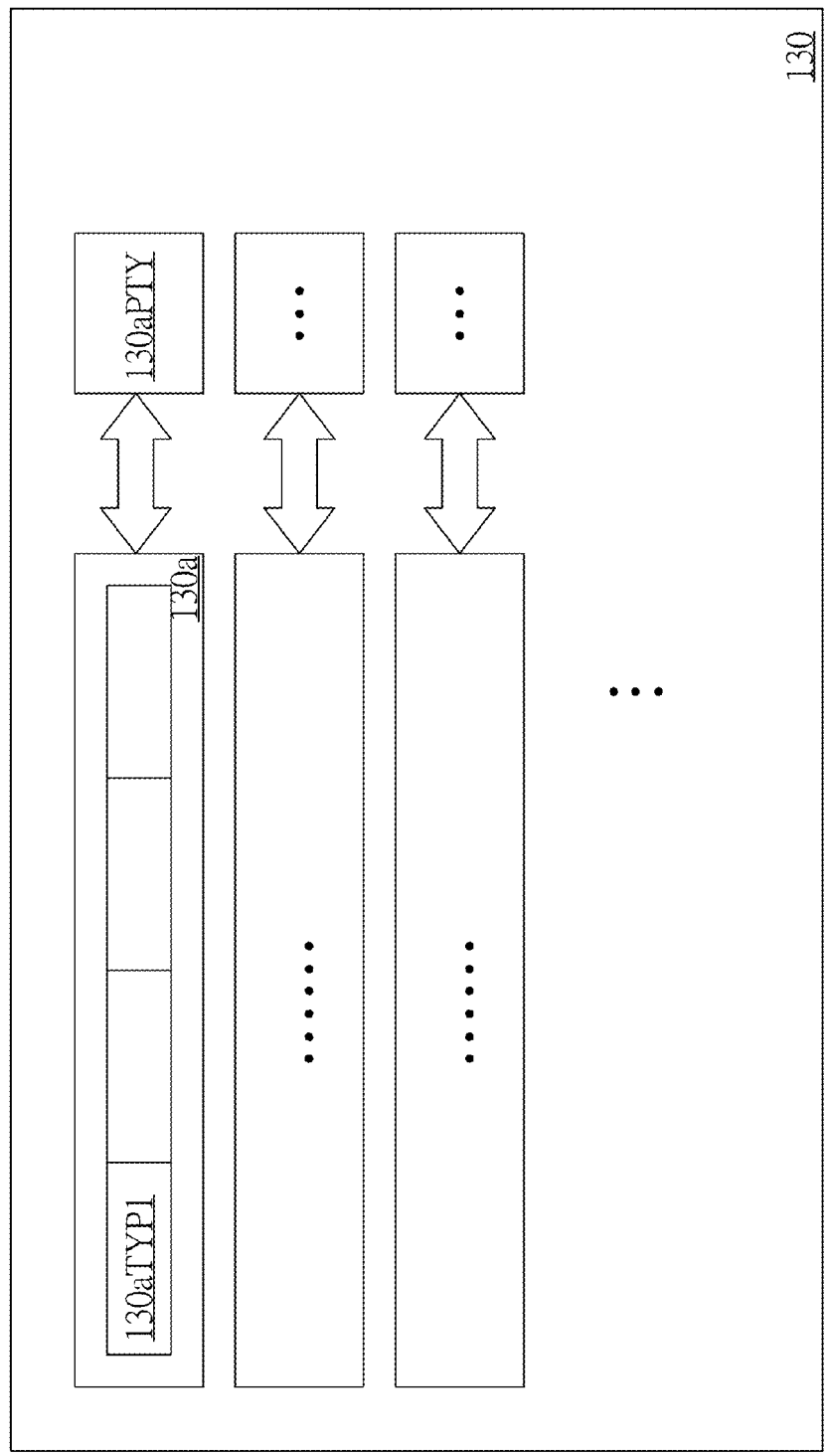
FIG. 1C is a schematic view illustrating a file storing priority table according to the first embodiment of the present invention.

Referring to FIGS. 1A~1C together. FIG. 1A is a schematic view illustrating an operation environment of a heterogeneous storing server 1 according to a first embodiment of the present invention; and FIG. 1B is a block diagram of the heterogeneous storing server 1 according to the first embodiment of the present invention. The heterogeneous storing server 1 comprises a connection interface 11, a storing unit 13 and a processing unit 15. The connection interface 11 connects to a plurality of storing devices 2 via a plurality of data nodes 3. The storing unit 13 stores a file storing priority table 130. The heterogeneous storing server and the file storing method of the present invention may be applied in any distributed file systems, but not merely in physical file systems or cloud file systems.

FIG. 1C is a schematic view illustrating a file storing priority table according to the first embodiment of the present invention. The file storing priority table 130 records a first device type group 130a, and a first group device attribute 130aPTY corresponding to the first device type group 130a. The interactions between the elements will be further described hereinbelow.

File properties are details about a file, such as file type, file size, or the date when a file was last modified, so the files properties could be used as the basis for subsequent storage classification. Specifically, the processing unit 15 of the heterogeneous storing server 1 retrieves a first file attribute pty1 of a file file, and then determines whether the first file attribute pty1 is consistent with the attributes of the type groups recorded in the file storing priority table 130. If the determination result is "yes", then a further determination about the storage of devices is made by using the type group with which the first file attribute pty1 is consistent.

Further speaking, in the first embodiment, the processing unit 15 determines that the first file attribute pty1 is consistent with a first group device attribute 130aPTY, and then further retrieves a first device type 130aTYP1 recorded by the first device type group 130a. Then, the processing unit 15 selects a first storing device 2a from the storing devices 2 according to the first device type 130aTYP1. The device type of the first storing device 2a is consistent with the definition of the first device type 130aTYP1. Subsequently, the processing unit 15 stores the file file into the first storing device 2a via the connection interface 11.

Figure 2:
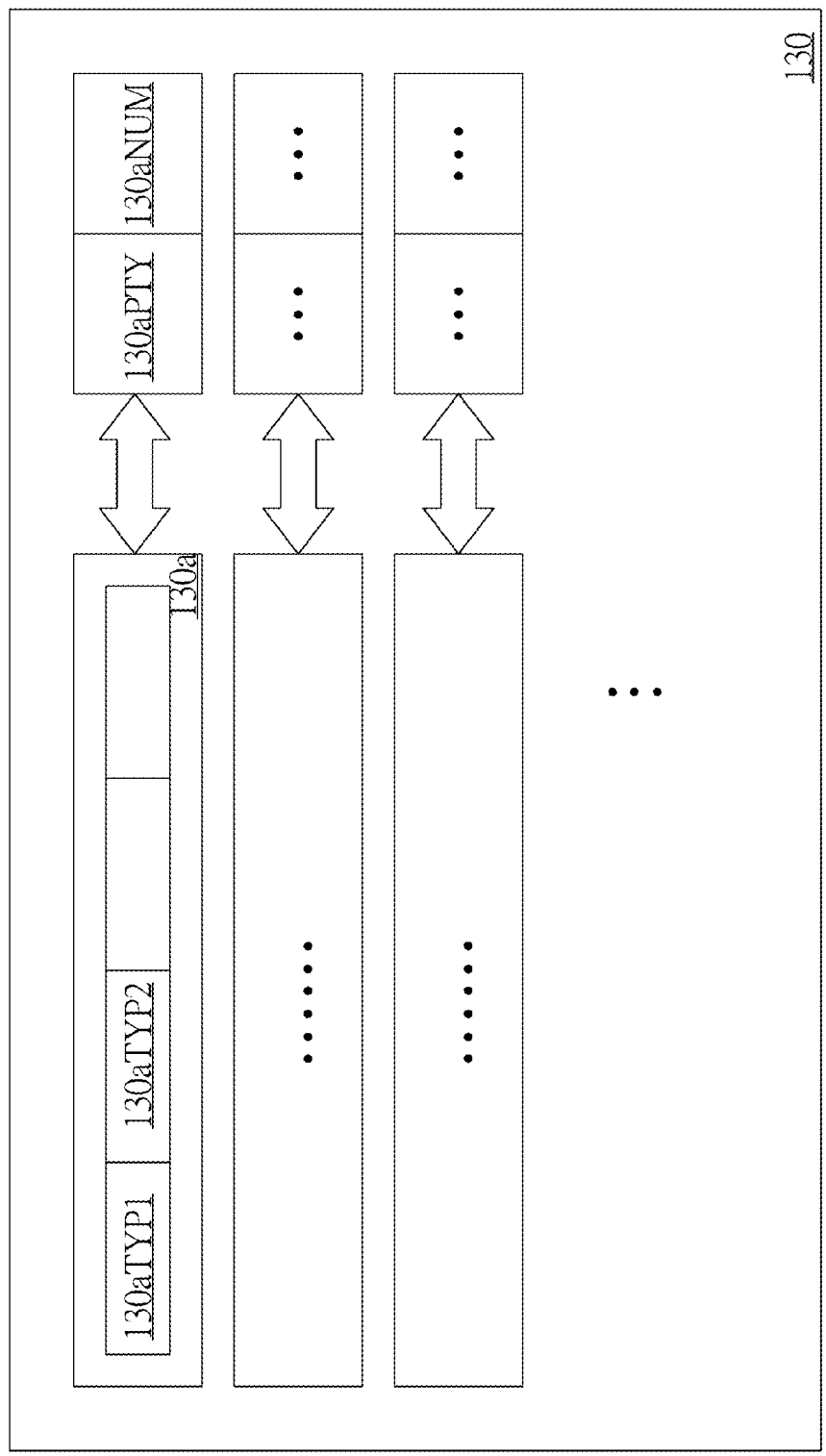
FIG. 2 is a schematic view illustrating a file storing priority table according to a second embodiment of the present invention.

Referring to FIG. 2, there is shown a schematic view illustrating a file storing priority table 130 according to a second embodiment of the present invention. It should be particularly appreciated that, the second embodiment has the same system architecture and network connection environment as the aforesaid embodiment, so elements bearing the same reference numerals also have the same functions and will not be further described herein. The second embodiment differs from the aforesaid embodiment in that, the first device type group 130a further comprises a second device type 130aTYP2, and the file storing priority table 130 further records a first group device count 130aNUM corresponding to the first device type group 130a.

Specifically, the file file is backed-up simultaneously when being stored into the first storing device 2a. Specifically, the processing unit 15 of the heterogeneous storing server 1 further retrieves a second device type 130aTYP2 of the first device type group 130a. Similarly, the processing unit 15 selects a second storing device 2b from the storing devices 2 according to the second device type 130aTYP2. The device type of the second storing device 2b is consistent with the definition of the second device type 130aTYP2. Subsequently, the processing unit 15 stores the backups of the file file into the second storing device 2b via the connection interface 11.

It should be particularly appreciated that, the number of the first storing device 2a and the second storing device 2b is equal to the first group device count 130aNUM. More specifically, in the present invention, the group device count indicates the number of records in the device type group, and each record in the device type group represents any storing device of the corresponding type. Therefore, when there are N device type records in the device type group, it represents that the file and the backups thereof will be stored into N corresponding storing devices respectively.

Accordingly, in the first embodiment, the first group device count 130aNUM is equal to the number of records of the first device type group 130a. Because the first device type group 130a records two device types (i.e., the first device type 130aTYP1 and the second device type 130aTYP2) and the processing unit 15 selects the corresponding first storing device 2a and second storing device 2b according to the first device type 130aTYP1 and the second device type 130aTYP2 respectively, the total number of the file file stored and the backups thereof is equal to two.

Additionally, it should be particularly appreciated that, when selecting a storing device from the storing devices 2 according to the device type, the heterogeneous storing server 1 selects the device according to priorities of the storing devices 2 because each of the storing devices 2 has a different priority determined by the accessing frequencies thereof from the perspective of the overall architecture.

Specifically, assume that, in the aforesaid embodiment, the first storing device 2a has a relatively low accessing frequency from the perspective of the overall architecture of the storing devices 2 (i.e., the first storing device 2a has a relatively low utilization efficiency). Then the first storing device 2a has a first priority level (not shown) which is relatively high, and the processing unit 15 will firstly select the storing device 2a that has a relatively high priority level (i.e., the first priority level) from the storing devices 2. The priority level of each of the storing devices may be stored into the corresponding data nodes so that the processing unit 15 can directly access the priority levels therefrom.

Figure 3A:
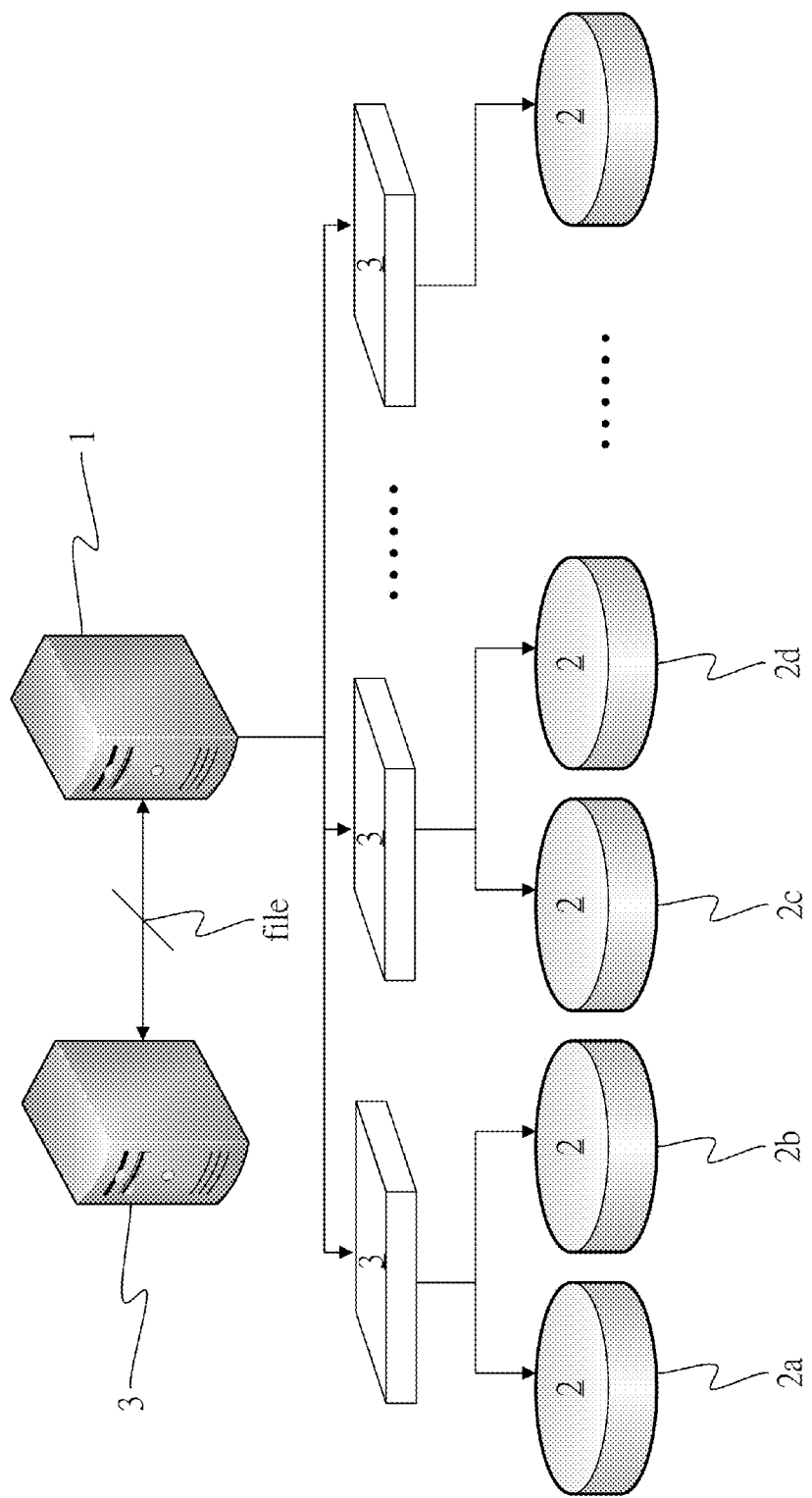
FIG. 3A is a schematic view illustrating an operation environment of a heterogeneous storing server according to a third embodiment of the present invention.
Figure 3B:
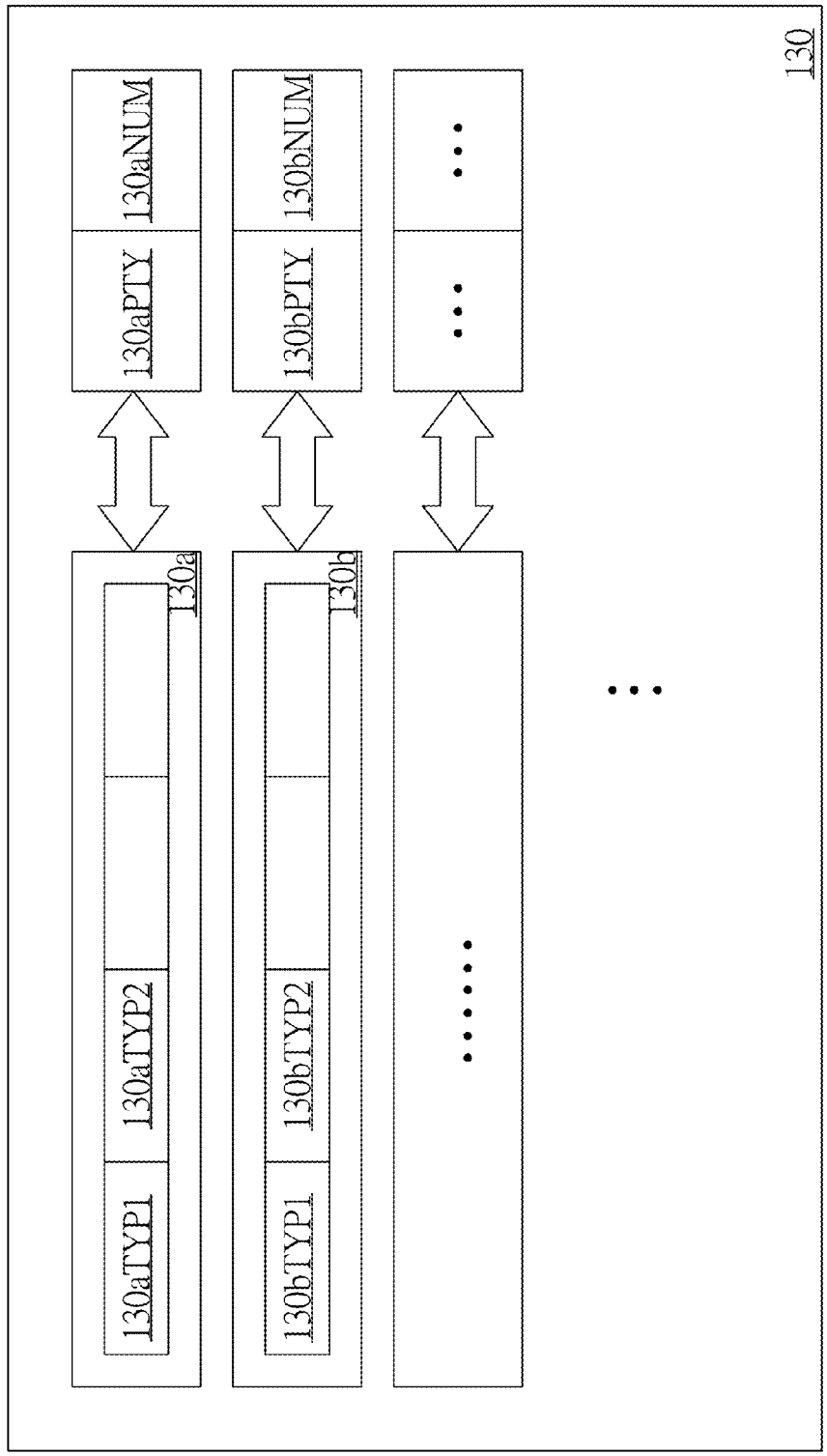
FIG. 3B is a schematic view illustrating a file storing priority table according to the third embodiment of the present invention.

Referring to FIGS. 3A~3B. FIG. 3A is a schematic view illustrating an operation environment of a heterogeneous storing server 1 according to a third embodiment of the present invention. FIG. 3B is a schematic view illustrating a file storing priority table 130 according to the third embodiment of the present invention. In the third embodiment, the file storing priority table 130 further records a second device type group 130b, a second group device attribute 130bPTY corresponding to the second device type group 130b and a second group device count 130bNUM.

It should be particularly appreciated that, the third embodiment has the same system architecture and network connection environment as the aforesaid embodiments, so elements bearing the same reference numerals also have the same functions and will not be further described herein. The third embodiment differs from the aforesaid embodiments in that, the connection interface 11 of the heterogeneous storing server 1 may further connect with a file server 3, and the file file may be received by the processing unit 15 from the file server 3 via the connection interface 11. Furthermore, the third embodiment further details the process of dynamically storing the file.

Specifically, after the file file has been stored for a period of time, the storing manner and the number of backups of the file file need to be further adjusted because the importance of the file file might be decreased due to the decreased accessing frequency thereof. Therefore, the file file is further adjusted according to the content of the priority table 130.

Specifically, the processing unit 15 re-determines a second file attribute pty2 of the file file after a time period (not shown). Subsequently, in the second embodiment, the processing unit 15 determines that the second file attribute pty2 is consistent with the second group device attribute 130bPTY, and then further retrieves a third device type 130bTYP1 that is recorded by the second device type group 130b.

Then, the processing unit 15 selects a third storing device 2c from the storing devices 2 according to the third device type 130bTYP1. The device type of the third storing device 2c is consistent with the definition of the third device type 130bTYP1. Subsequently, the processing unit 15 stores the file file into the third storing device 2c via the connection interface 11. On the other hand, the file file needs to be backed-up again. Specifically, the processing unit 15 further retrieves a fourth device type 130bTYP2 of the second device type group 130b. Similarly, the processing unit 15 selects a fourth storing device 2d from the storing devices 2 according to the fourth device type 130bTYP2. The device type of the fourth storing device 2d is consistent with the definition of the fourth device type 130bTYP2. Subsequently, the processing unit 15 stores the backups of the file file into the fourth storing device 2d via the connection interface 11.

Similarly, the number of the third storing device 2c and the fourth storing device 2d is equal to the second group device count 130bNUM. In the second embodiment, the second group device count 130bNUM is equal to the number of records of the second device type group 130b. Because the second device type group 130b records two device types (i.e., the third device type 130bTYP1 and the fourth device type 130bTYP2) and the processing unit 15 selects the third storing device 2c and the fourth storing device 2d correspondingly according to the third device type 130bTYP1 and the fourth device type 130bTYP2 respectively, the total number of the file file stored and the backups thereof is equal to two.

It should be particularly appreciated that, in the third embodiment, no record of the second device type group 130b is the same as those of the first device type group 130a. However, in other implementations, the second device type group 130b might have records that are the same as those of the first device type group 130a. Accordingly, the present invention can also accomplish the storing and the backing-up of the file more efficiently without having to additionally move the file.

More specifically, after having determined that the second file attribute pty2 is consistent with the second group device attribute 130bPTY, the processing unit 15 may further determine that the first device type 130aTYP1 of the first device type group 130a is the same as the third device type 130bTYP1 of the second device type group 130b. This means that the first device type group 130a and the second device type group 130b have a same type record; and in other words, the first device type group 130a and the second device type group 130b have storing devices of the same level.

Accordingly, because the file file has already been stored into the storing device 2a corresponding to the first device type 130aTYP1, the step of selecting the storing device 2C by the processing unit 15 can be omitted and the file file stored in the storing device 2a will be directly used. In other words, it is unnecessary to additionally store the file file into the storing device 2c again.

In another implementation, after having determined that the second file attribute pty2 is consistent with the second group device attribute 130bPTY, the processing unit 15 may further determine that the second device type 130aTYP2 of the first device type group 130a is the same as the third device type 130bTYP1 (or the fourth device type 130bTYP2) of the second device type group 130b.

Similarly, because the file file has been backed up in the storing device 2b corresponding to the second device type 130aTYP2, the step of selecting the storing device 2c (or the storing device 2d) by the processing unit 15 can be omitted and the file file backed-up in the storing device 2b will be directly used. In other words, it is unnecessary to additionally back up the file file into the storing device 2c (or the storing device 2d) again.

Similarly, in the third embodiment, each of the storing devices has their respective priority levels for accessing. Therefore, when selecting the storing devices, the processing unit of the heterogeneous storing server may also refer to the priority level of each of the storing devices so as to balance the utilization efficiencies of the storing devices.

Figure 4A:
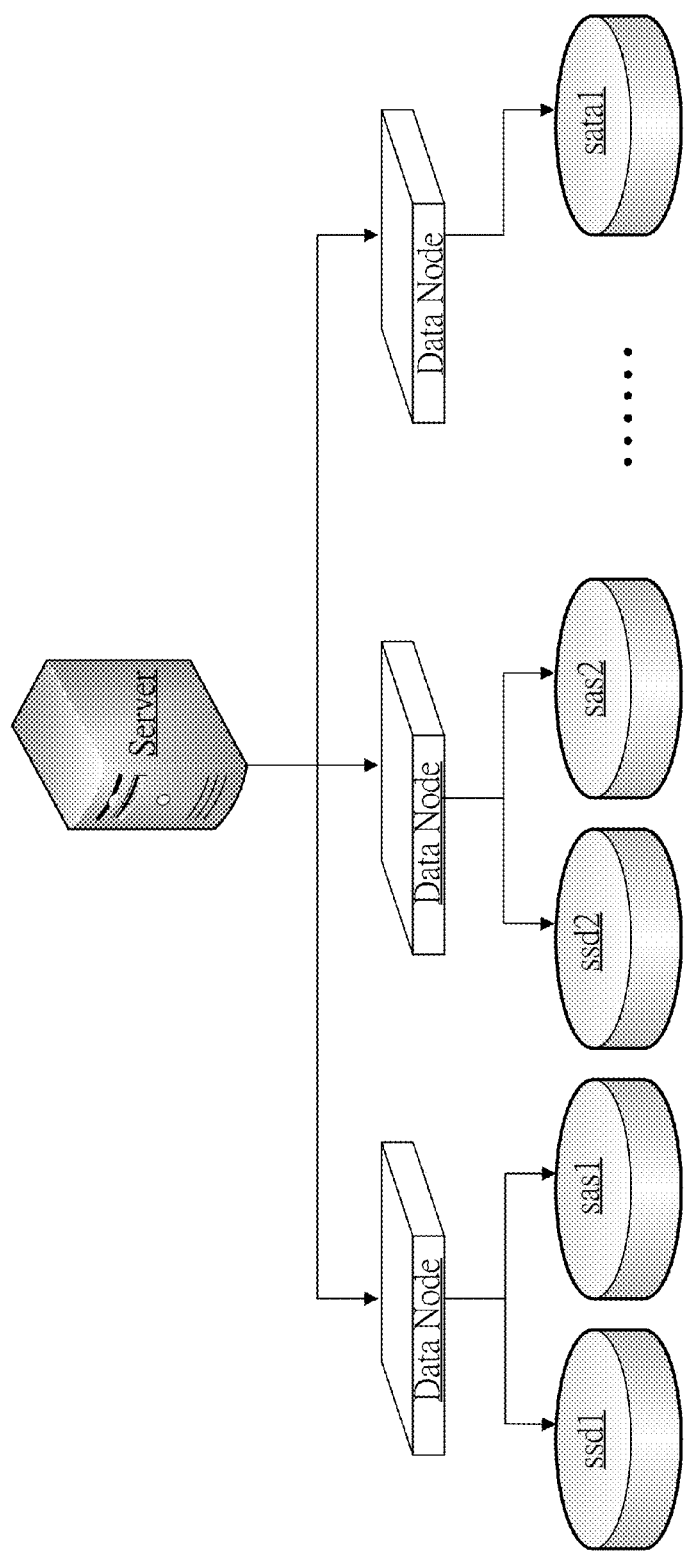
FIG. 4A is a schematic view illustrating an operation environment of a heterogeneous storing server according to a fourth embodiment of the present invention.
Figure 4B:
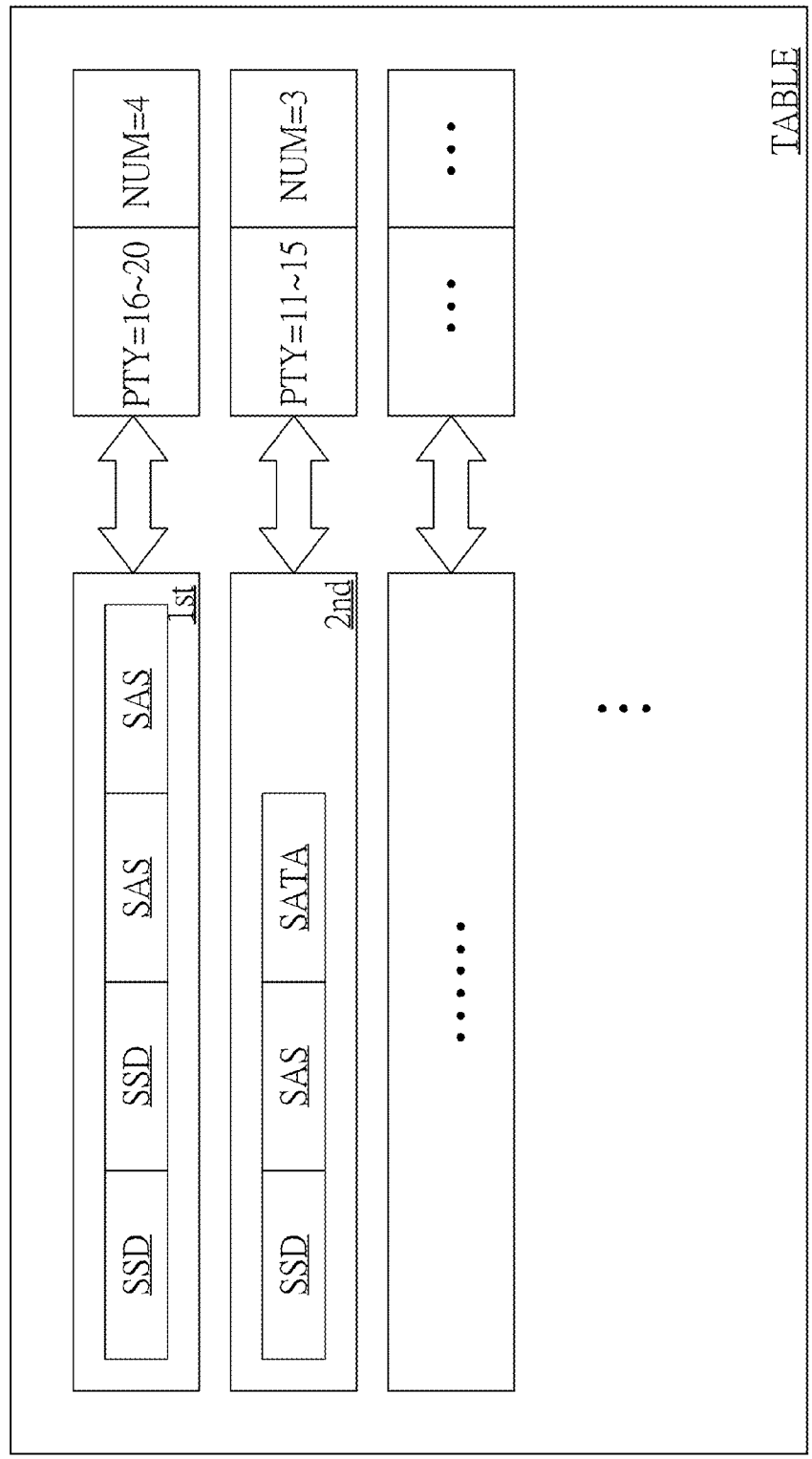
FIG. 4B is a schematic view illustrating a file storing priority table according to the fourth embodiment of the present invention.

Referring to FIGS. 4A~4B. FIG. 4A is a schematic view illustrating an operation environment of a heterogeneous storing server Server according to a fourth embodiment of the present invention; and FIG. 4B is a schematic view illustrating a file storing priority table TABLE according to the fourth embodiment of the present invention. It should be particularly appreciated that, the fourth embodiment has the same hardware architecture as the aforesaid embodiments, so this will not be further described; and the fourth embodiment is mainly intended to describe exemplary embodiments so that those skilled in the art can have a clearer understanding of the technologies of the present invention.

Specifically, assume that there is a JPG file to be stored. Then because the JPG preset file attribute is 19 and is consistent with the group device attribute (ranging between 16~20) corresponding to the device type group 1st, the JPG file will be stored subsequently by using the storing device type recorded by the device type group 1st.

Further speaking, in the fourth embodiment, the heterogeneous storing server Server retrieves a first device type record SSD recorded by the device type group 1st, and then according to the device type SSD, selects a storing device of an SSD type from the storing devices via a data node Data Node. Because a storing device ssd1 has a higher priority level than a storing device ssd2 of the same level among the storing devices, the heterogeneous storing server Server selects the storing device ssd1 and then stores the JPG file into the storing device ssd1.

On the other hand, the heterogeneous storing server Server further retrieves other device types SSD, SAS and SAS of the device type group 1st, and then selects storing devices of the SSD type and the SAS type according to the other device types SSD, SAS and SAS. In the fourth embodiment, the heterogeneous storing server Server selects storing devices ssd2, sas1 and sas2 from the storing devices to store the backed-up files of the JPG file respectively.

Obviously, because the device type group 1st has four records, it means that four corresponding storing devices will be selected. Accordingly, the total number of the JPG file and the backups thereof is four.

Then, after a period of time, the file attribute of the JPG file is adjusted to 14 because the importance thereof is decreased. Therefore, the heterogeneous storing server Server re-determines that the file attribute of the JPG file is consistent with the group device attribute (ranging between 11~15) corresponding to a device type group 2nd, and then further retrieves the first device type SSD recorded by the device type group 2nd.

In this case, because the device type groups 1st and 2nd both have device types SSD and SAS, it is unnecessary to move the JPG file that is originally stored in the storing devices ssd1 and sas1. Then, similarly, the heterogeneous storing server Server further retrieves the other device type SATA of the device type group 2nd, and then selects the storing device of the SATA type according to the other device type SATA. In the third embodiment, the heterogeneous storing server Server selects a storing device sata1 from the storing devices to store a backup of the JPG file.

In this way, the present invention can dynamically store and back up the file efficiently through different device type groups settings in the file storing priority table, which can ensure the high flexibility and efficiency in use of the system.

Figure 5:
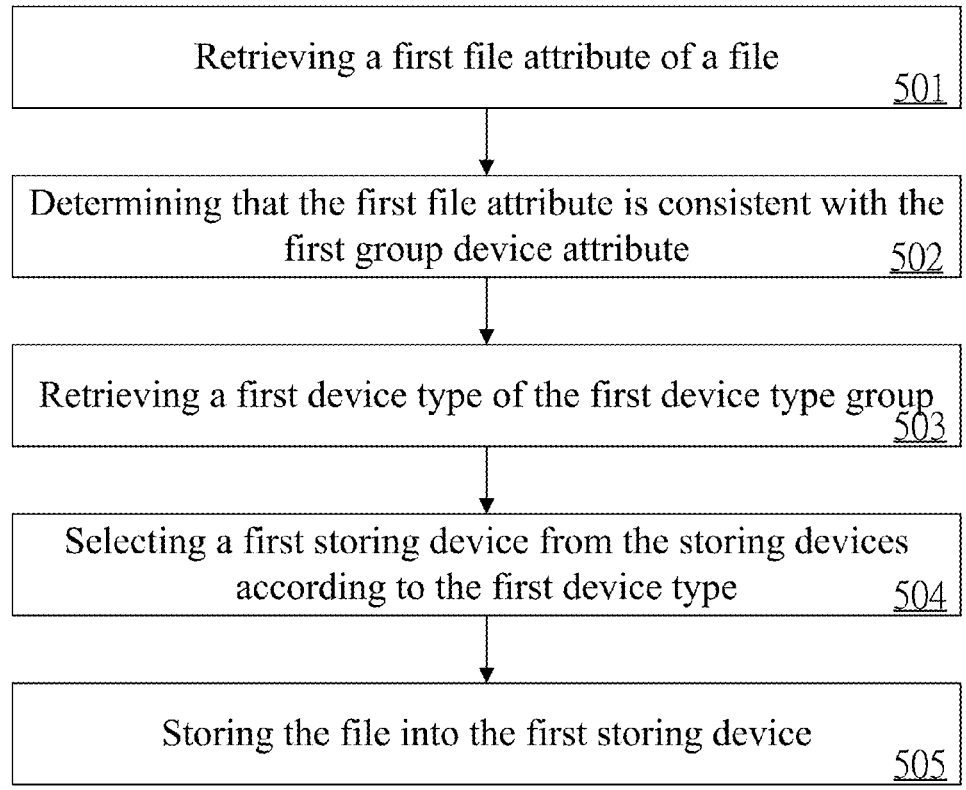
FIG. 5 is a flowchart diagram of a file storing method according to a fifth embodiment of the present invention.

A fifth embodiment of the present invention is a file storing method, a flowchart diagram of which is shown in FIG. 5. The method of the fifth embodiment is used in a heterogeneous storing server (e.g., the heterogeneous storing server 1 of the aforesaid embodiments). The heterogeneous storing server is connected to a plurality of storing devices via a plurality of data nodes. The heterogeneous storing server stores a file storing priority table. The file storing priority table records a first device type group. The first device type group has a corresponding first group device attribute. The steps of the fifth embodiment are detailed as follows.

Firstly, step 501 is executed to enable the heterogeneous storing server to retrieve a first file attribute of a file. Step 502 is executed to enable the heterogeneous storing server to determine that the first file attribute is consistent with the first group device attribute. Step 503 is executed to enable the heterogeneous storing server to retrieve a first device type of the first device type group according to the result of the step 502.

Then, step 504 is executed to enable the heterogeneous storing server to select a first storing device from the storing devices according to the first device type. Step 505 is executed to enable the heterogeneous storing server to store the file into the first storing device.

Figure 6:
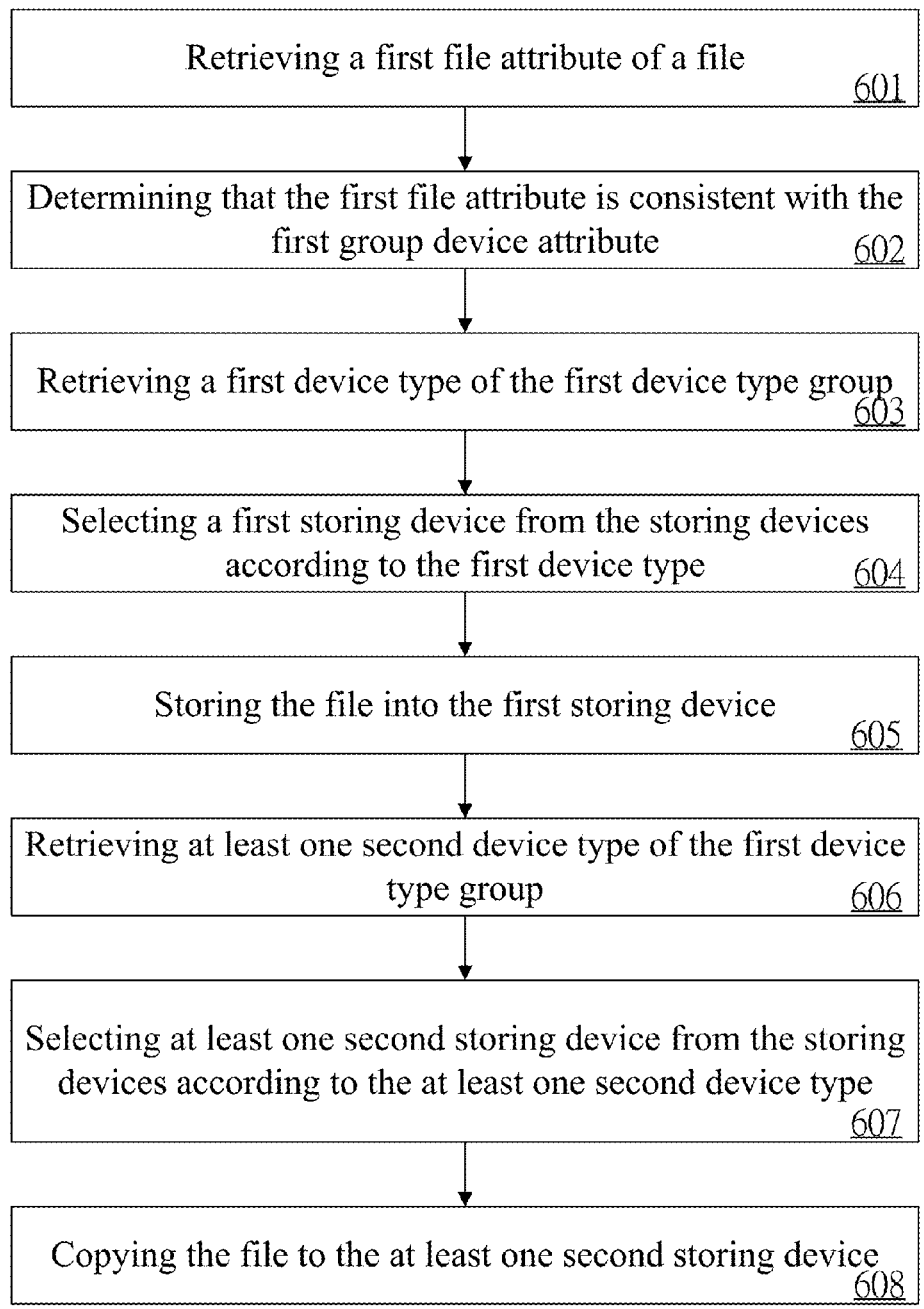
FIG. 6 is a flowchart diagram of a file storing method according to a sixth embodiment of the present invention.

A sixth embodiment of the present invention is a file storing method, a flowchart diagram of which is shown in FIG. 6. The method of the sixth embodiment is used in a heterogeneous storing server (e.g., the heterogeneous storing server 1 of the aforesaid embodiments). The heterogeneous storing server is connected to a plurality of storing devices via a plurality of data nodes. The heterogeneous storing server stores a file storing priority table. The file storing priority table records a first device type group. The first device type group has a first group device attribute and a first group device count which correspond to the first device type group. The steps of the sixth embodiment are detailed as follows.

Firstly, step 601 is executed to enable the heterogeneous storing server to retrieve a first file attribute of a file. Step 602 is executed to enable the heterogeneous storing server to determine that the first file attribute is consistent with the first group device attribute. Step 603 is executed to enable the heterogeneous storing server to retrieve a first device type of the first device type group according to the result of the step 602.

Then, step 604 is executed to enable the heterogeneous storing server to select a first storing device from the storing devices according to the first device type. Step 605 is executed to enable the heterogeneous storing server to store the file into the first storing device. Step 606 is executed to enable the heterogeneous storing server to retrieve at least one second device type of the first device type group.

Step 607 is executed to enable the heterogeneous storing server to select at least one second storing device from the storing devices according to the at least one second device type. Finally, step 608 is executed to enable the heterogeneous storing server to copy the file to the at least one second storing device. The number of the first storing device and the at least one second storing device is equal to the first group device count.

Figure 7A:
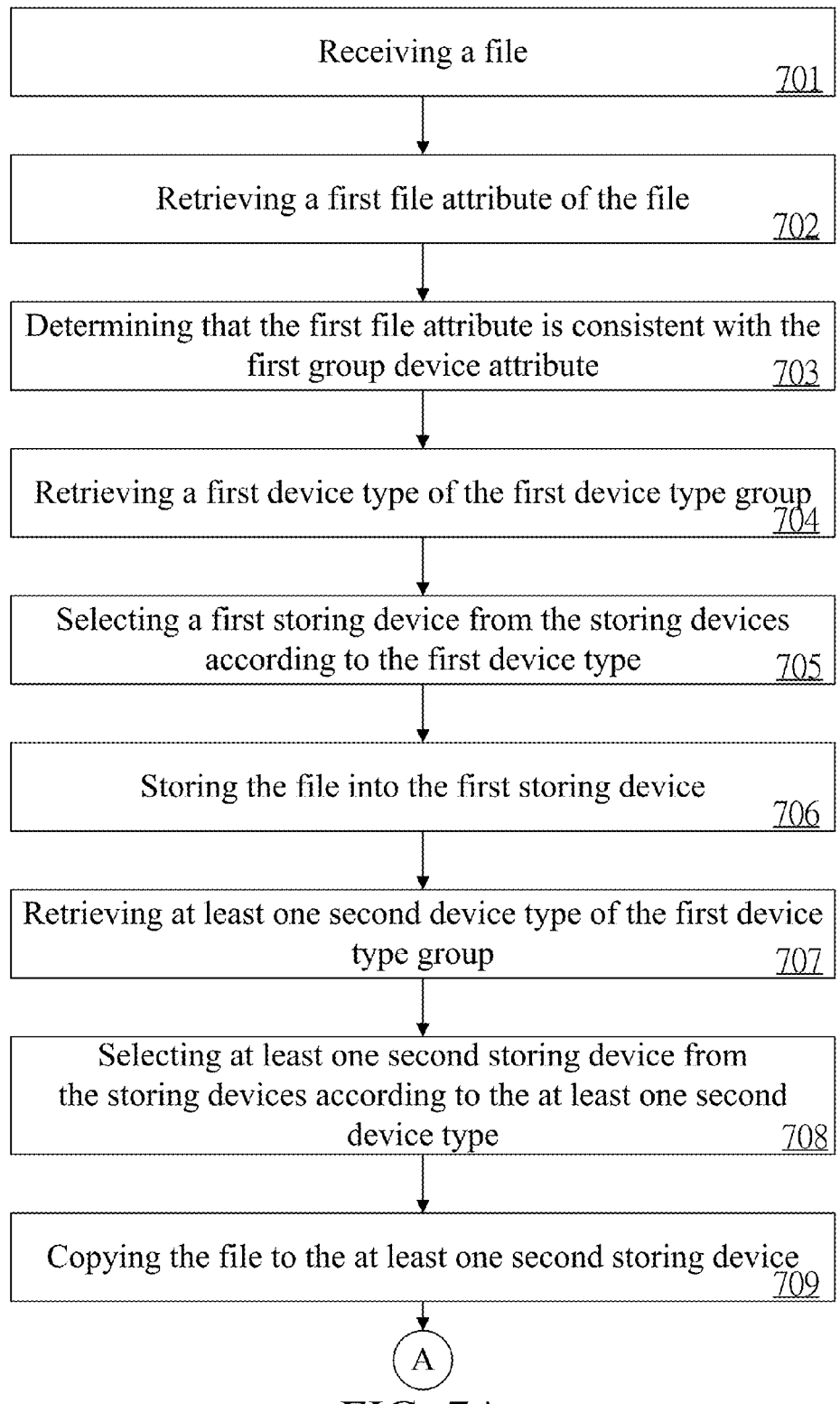
FIGS. 7A~7B are flowchart diagrams of a file storing method according to a seventh embodiment of the present invention.
Figure 7B:
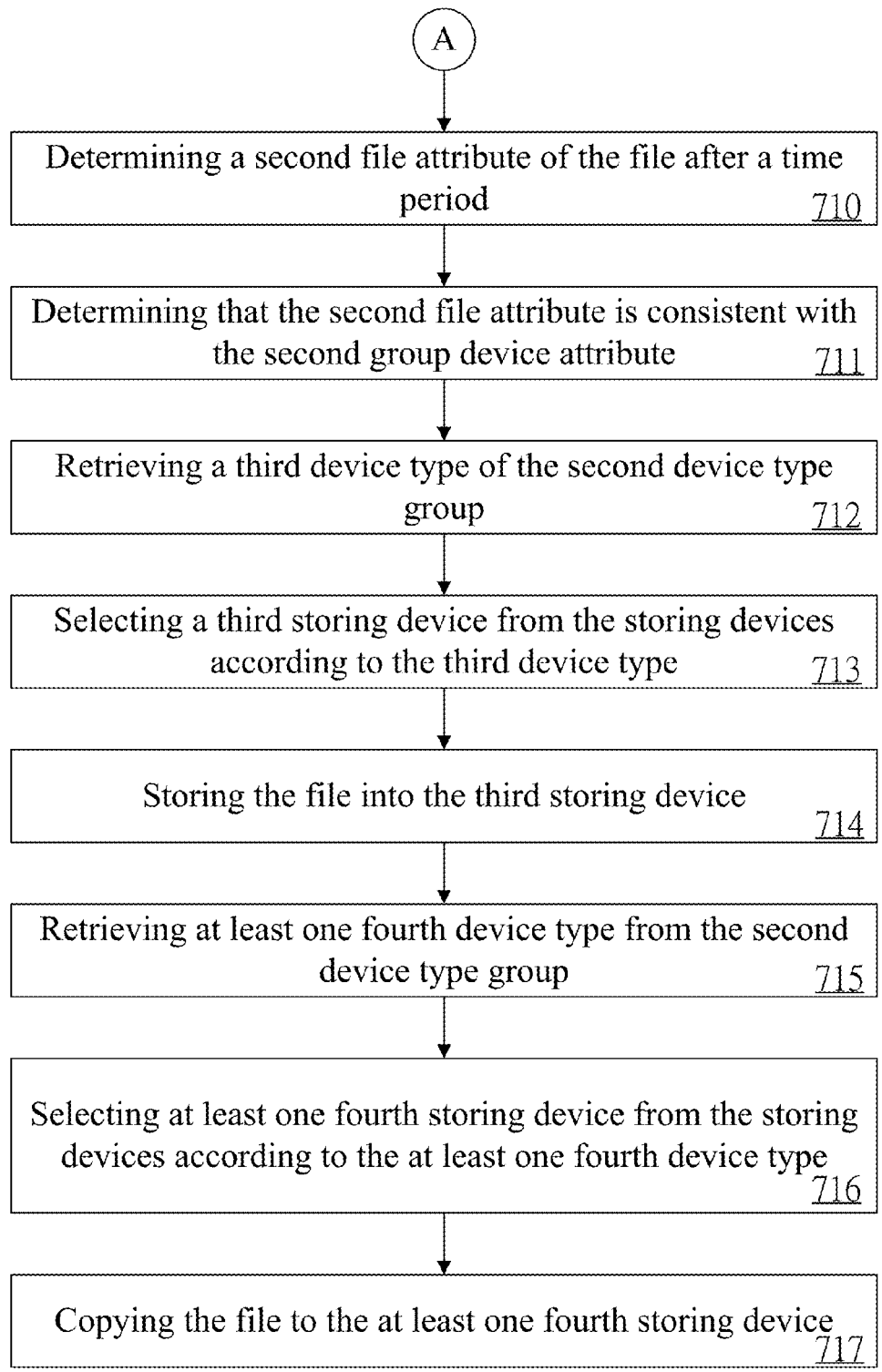

A seventh embodiment of the present invention is a file storing method, a flowchart diagram of which is shown in FIGS. 7A~7B. The method of the seventh embodiment is used in a heterogeneous storing server (e.g., the heterogeneous storing server 1 of the aforesaid embodiments). The heterogeneous storing server is connected with a plurality of storing devices and a file server.

The heterogeneous storing server stores a file storing priority table. The file storing priority table records a first device type group and a second device type group. The first device type group has a first group device attribute and a first group device count that correspond to the first device type group; and the second device type group has a second group device attribute and a second group device count that correspond to the second device type group. The steps of the seventh embodiment are detailed as follows.

Firstly, step 701 is executed to enable the heterogeneous storing server to receive a file from the file server. Step 702 is executed to enable the heterogeneous storing server to retrieve a first file attribute of the file. Step 703 is executed to enable the heterogeneous storing server to determine that the first file attribute is consistent with the first group device attribute. Step 704 is executed to enable the heterogeneous storing server to retrieve a first device type of the first device type group according to the result of the step 703.

Then, step 705 is executed to enable the heterogeneous storing server to select a first storing device from the storing devices according to the first device type. Step 706 is executed to enable the heterogeneous storing server to store the file into the first storing device. Step 707 is executed to enable the heterogeneous storing server to retrieve at least one second device type of the first device type group.

Step 708 is executed to enable the heterogeneous storing server to select at least one second storing device from the storing devices according to the at least one second device type. Finally, step 709 is executed to enable the heterogeneous storing server to copy the file to the at least one second storing device. The number of the first storing device and the at least one second storing device is equal to the first group device count.

Subsequently, after the attributes of the file have been adjusted, the file can be dynamically stored and backed up by means of different device type groups. Step 710 is executed to enable the heterogeneous storing server to determine a second file attribute of the file after a time period. Step 711 is executed to enable the heterogeneous storing server to determine that the second file attribute is consistent with the second group device attribute.

Then, the heterogeneous storing server determines that the first device type group and the second device type group do not have a same device type, so step 712 is executed to enable the heterogeneous storing server to retrieve a third device type of the second device type group. Step 713 is executed to enable the heterogeneous storing server to select a third storing device from the storing devices according to the third device type.

Subsequently, step 714 is executed to enable the heterogeneous storing server to store the file into the third storing device. Step 715 is executed to enable the heterogeneous storing server to retrieve at least one fourth device type from the second device type group. Step 716 is executed to enable the heterogeneous storing server to select at least one fourth storing device from the storing devices according to the at least one fourth device type. Finally, step 717 is executed to enable the heterogeneous storing server to copy the file to the at least one fourth storing device. The number of the third storing device and the at least one fourth storing device is equal to the second group device count.

Figure 8A:
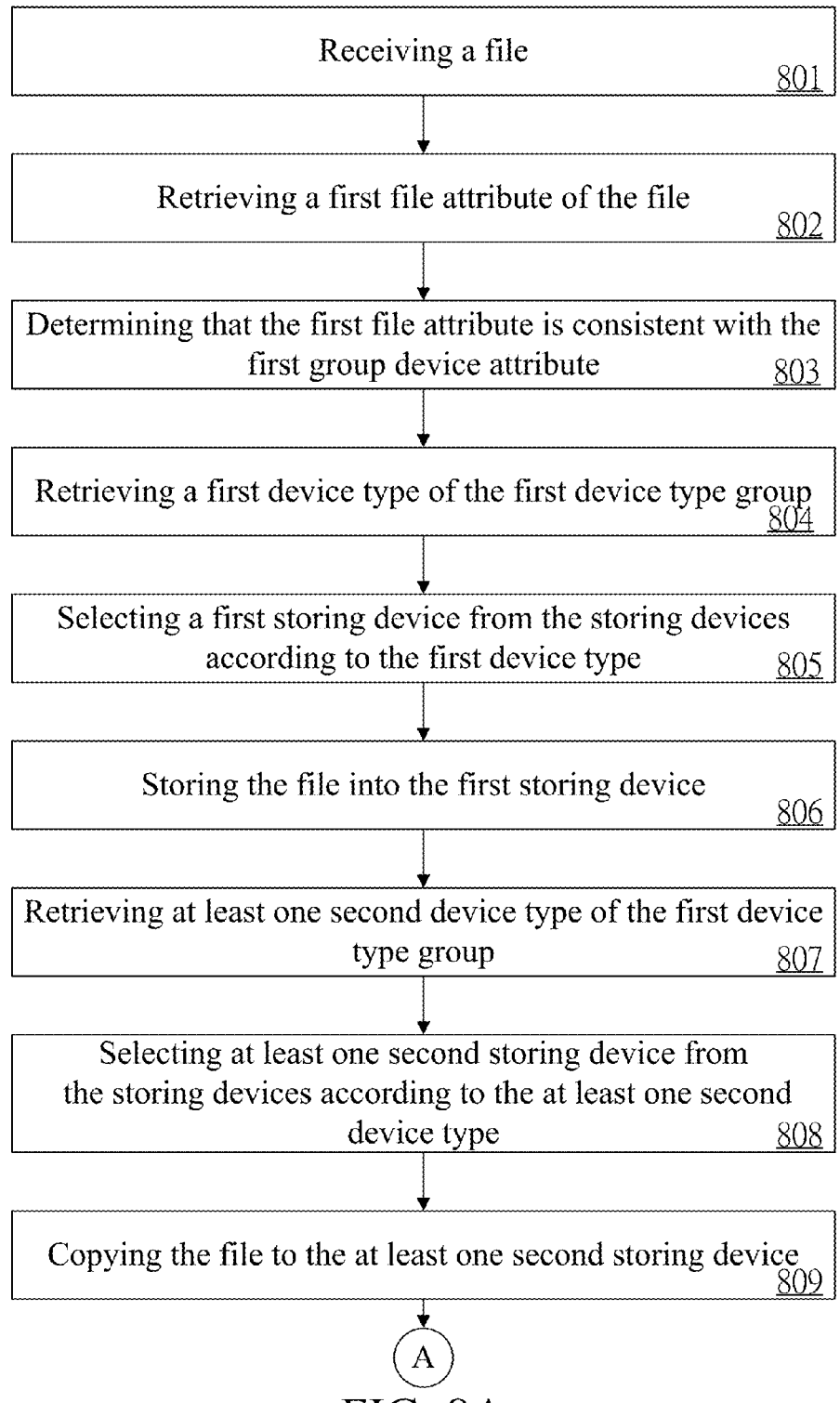
FIGS. 8A~8B are flowchart diagrams of a file storing method according to an eighth embodiment of the present invention.
Figure 8B:
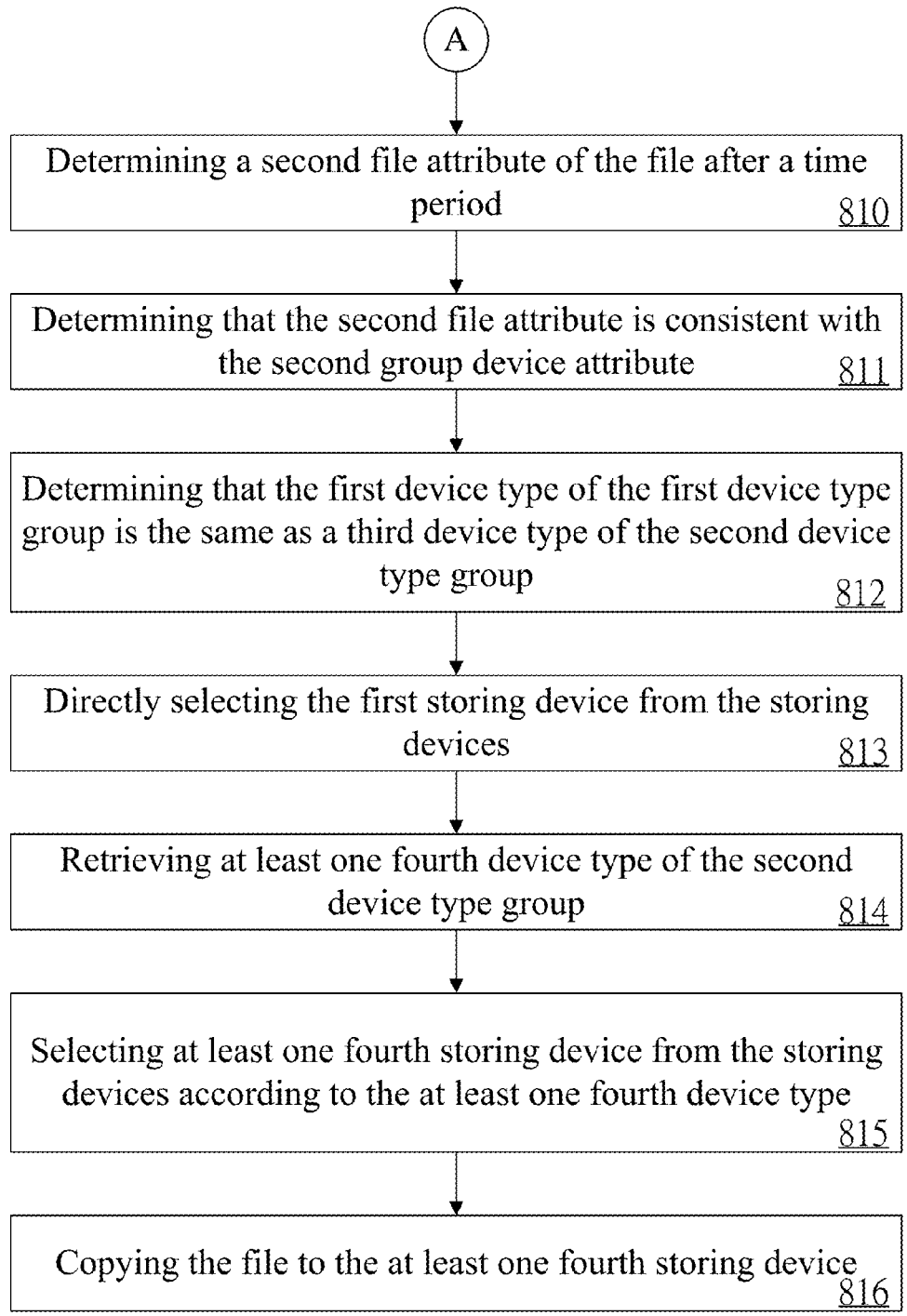

An eighth embodiment of the present invention is a file storing method, a flowchart diagram of which is shown in FIGS. 8A~8B. The method of the eighth embodiment is used in a heterogeneous storing server (e.g., the heterogeneous storing server 1 of the aforesaid embodiments). The heterogeneous storing server is connected with a plurality of storing devices and a file server.

The heterogeneous storing server stores a file storing priority table. The file storing priority table records a first device type group and a second device type group. The first device type group has a first group device attribute and a first group device count that correspond to the first device type group; and the second device type group has a second group device attribute and a second group device count that correspond to the second device type group. The steps of the eighth embodiment are detailed as follows.

Firstly, step 801 is executed to enable the heterogeneous storing server to receive a file from the file server. Step 802 is executed to enable the heterogeneous storing server to retrieve a first file attribute of the file. Step 803 is executed to enable the heterogeneous storing server to determine that the first file attribute is consistent with the first group device attribute. Step 804 is executed to enable the heterogeneous storing server to retrieve a first device type of the first device type group according to the result of the step 803.

Then, step 805 is executed to enable the heterogeneous storing server to select a first storing device from the storing devices according to the first device type. Step 806 is executed to enable the heterogeneous storing server to store the file into the first storing device. Step 807 is executed to enable the heterogeneous storing server to retrieve at least one second device type of the first device type group.

Step 808 is executed to enable the heterogeneous storing server to select at least one second storing device from the storing devices according to the at least one second device type. Finally, step 809 is executed to enable the heterogeneous storing server to copy the file to the at least one second storing device. The number of the first storing device and the at least one second storing device is equal to the first group device count.

Subsequently, after the attributes of the file have been adjusted, the file can be dynamically stored and backed up by means of different device type groups. Step 810 is executed to enable the heterogeneous storing server to determine a second file attribute of the file after a time period. Step 811 is executed to enable the heterogeneous storing server to determine that the second file attribute is consistent with the second group device attribute.

Then, in the eighth embodiment, the heterogeneous storing server determines that the first device type group and the second device type group have a same device type, so step 812 is executed to enable the heterogeneous storing server to determine that the first device type of the first device type group is the same as a third device type of the second device type group. Step 813 is executed to enable the heterogeneous storing server to directly select the first storing device from the storing devices. In other words, the file that is originally stored in the first storing device is used without having to further copy the file.

Step 814 is executed to enable the heterogeneous storing server to retrieve at least one fourth device type of the second device type group. Step 815 is executed to enable the heterogeneous storing server to select at least one fourth storing device from the storing devices according to the at least one fourth device type. Step 816 is executed to enable the heterogeneous storing server to copy the file to the at least one fourth storing device. The number of the first storing device and the at least one fourth storing device is equal to the second group device count.

Figure 9A:
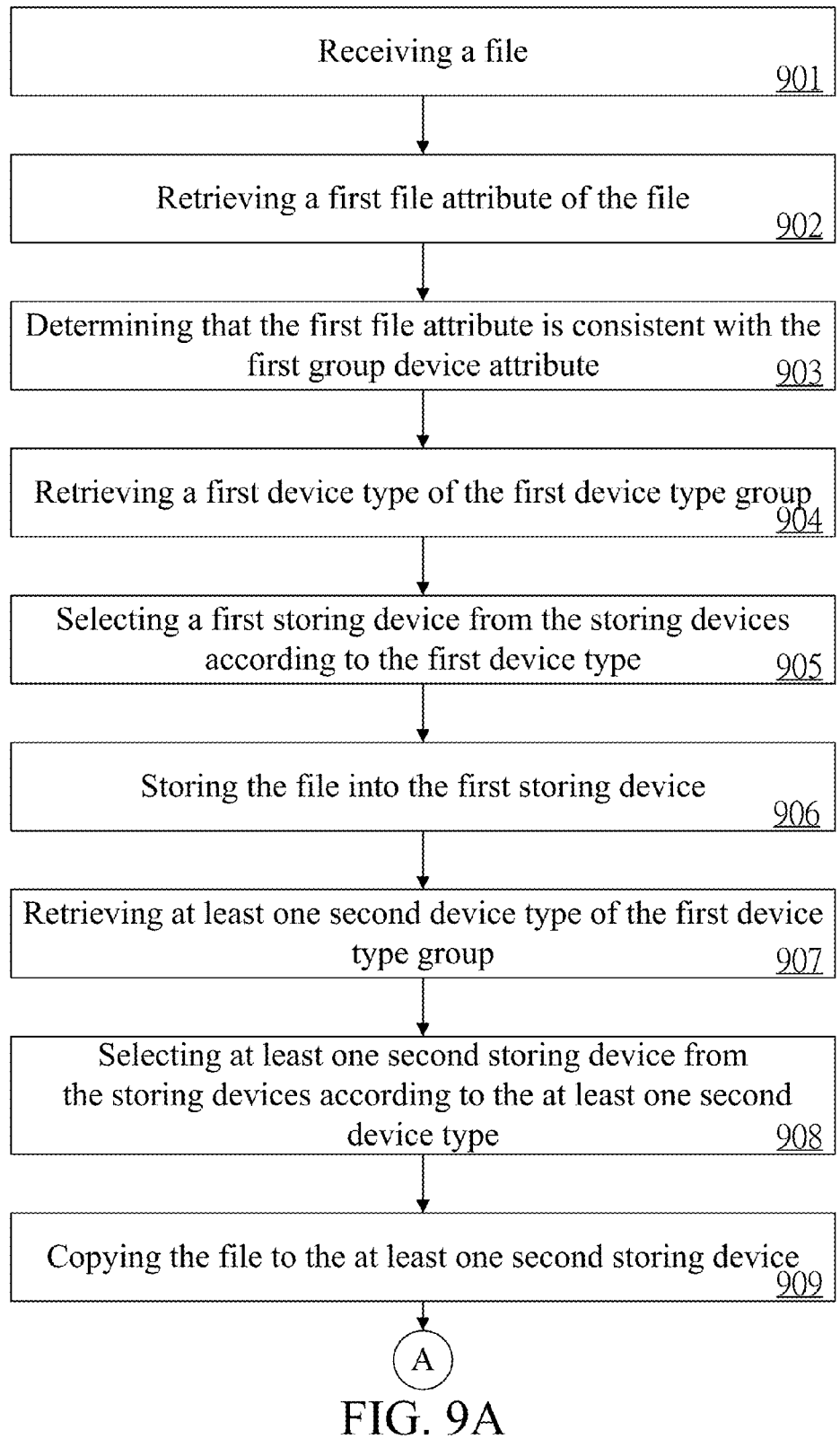
FIGS. 9A~9B are flowchart diagrams of a file storing method according to a ninth embodiment of the present invention.
Figure 9B:
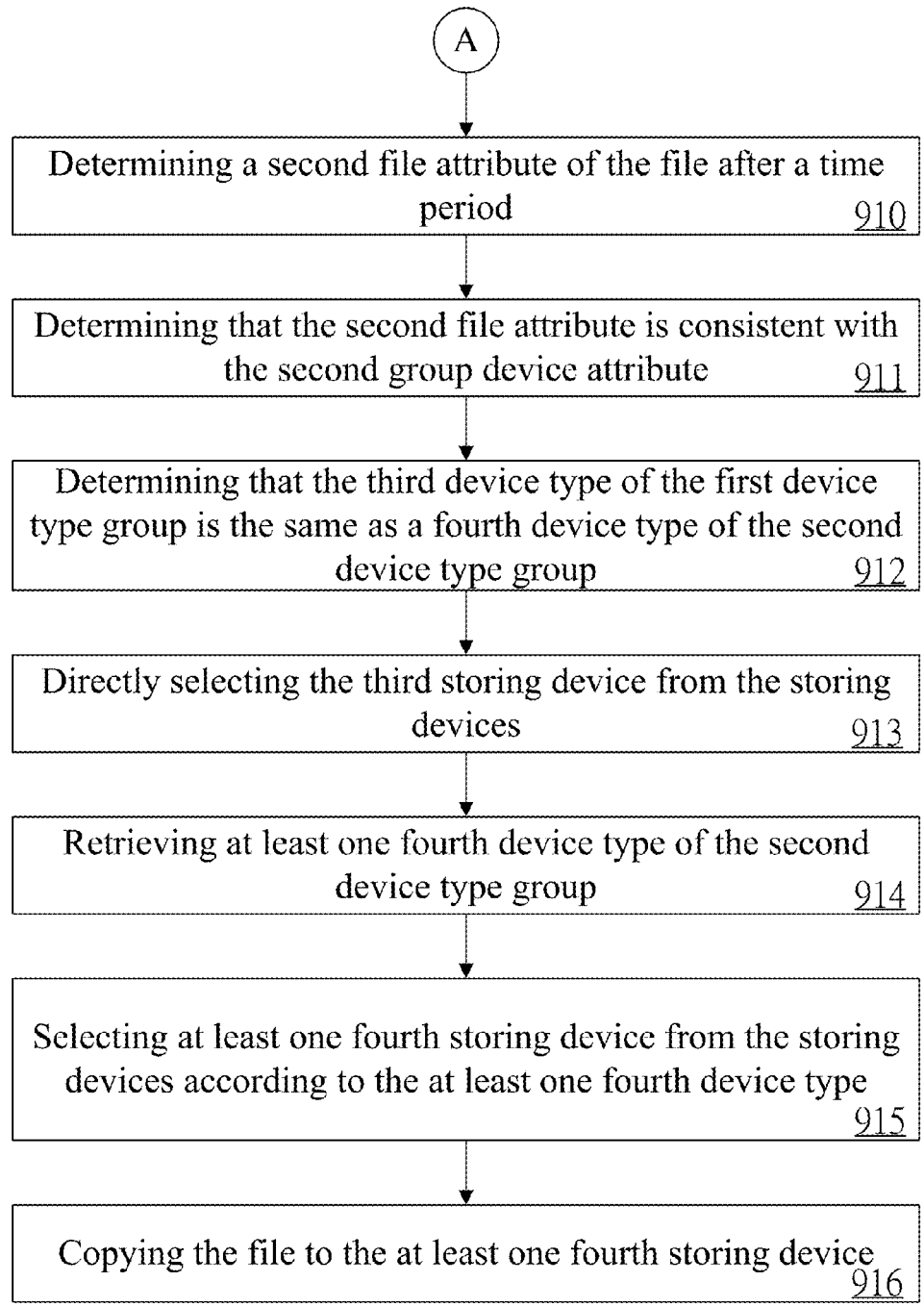

A ninth embodiment of the present invention is a file storing method, a flowchart diagram of which is shown in FIGS. 9A~9B. The method of the ninth embodiment is used in a heterogeneous storing server (e.g., the heterogeneous storing server 1 of the aforesaid embodiments). The heterogeneous storing server is connected with a plurality of storing devices and a file server.

The heterogeneous storing server stores a file storing priority table. The file storing priority table records a first device type group and a second device type group. The first device type group has a first group device attribute and a first group device count that correspond to the first device type group; and the second device type group has a second group device attribute and a second group device count that correspond to the second device type group. The steps of the ninth embodiment are detailed as follows.

Firstly, step 901 is executed to enable the heterogeneous storing server to receive a file from the file server. Step 902 is executed to enable the heterogeneous storing server to retrieve a first file attribute of the file. Step 903 is executed to enable the heterogeneous storing server to determine that the first file attribute is consistent with the first group device attribute. Step 904 is executed to enable the heterogeneous storing server to retrieve a first device type of the first device type group according to the result of the step 903.

Then, step 905 is executed to enable the heterogeneous storing server to select a first storing device from the storing devices according to the first device type. Step 906 is executed to enable the heterogeneous storing server to store the file into the first storing device. Step 907 is executed to enable the heterogeneous storing server to retrieve at least one second device type of the first device type group.

Step 908 is executed to enable the heterogeneous storing server to select at least one second storing device from the storing devices according to the at least one second device type. Finally, step 909 is executed to enable the heterogeneous storing server to copy the file to the at least one second storing device. The number of the first storing device and the at least one second storing device is equal to the first group device count.

It should be particularly appreciated that, the at least one second device type comprises a third device type, and the at least one second storing device comprises a third storing device corresponding to the third device type. Then, after the attributes of the file have been adjusted, the file can be dynamically stored and backed up by means of different device type groups.

Step 910 is executed to enable the heterogeneous storing server to determine a second file attribute of the file after a time period. Step 911 is executed to enable the heterogeneous storing server to determine that the second file attribute is consistent with the second group device attribute.

Then, in the ninth embodiment, the heterogeneous storing server determines that the first device type group and the second device type group have a same device type, so step 912 is executed to enable the heterogeneous storing server to determine that the third device type of the first device type group is the same as a fourth device type of the second device type group. Step 913 is executed to enable the heterogeneous storing server to directly select the third storing device from the storing devices. In other words, the file that is originally backed up in the third storing device is used without having to further copy the file.

Step 914 is executed to enable the heterogeneous storing server to retrieve at least one fourth device type of the second device type group. Step 915 is executed to enable the heterogeneous storing server to select at least one fourth storing device from the storing devices according to the at least one fourth device type. Step 916 is executed to enable the heterogeneous storing server to copy the file to the at least one fourth storing device. The number of the third storing device and the at least one fourth storing device is equal to the second group device count.

From all above-mentioned examples with good details, the heterogeneous storing server and the file storing method can dynamically adjust the storing manner and the number of backups of a file according to the content of the file storing priority table, and improve the flexibility in use and the reliability of the storing system.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A file storing method for a heterogeneous storing server, the heterogeneous storing server being connected to a plurality of storing devices via a plurality of data nodes, the heterogeneous storing server storing a file storing priority table which records a first device type group, a first group device attribute and a first group device count, the first device type group corresponding to the first group device attribute and the first group device count, the file storing method comprising:
   (a) the heterogeneous storing server retrieving a first file attribute of a file;
   (b) the heterogeneous storing server determining that the first file attribute of the file is consistent with the first group device attribute of the file storing priority table;
   (c) the heterogeneous storing server retrieving a first device type of the first device type group according to the result of the step (b);
   (d) the heterogeneous storing server selecting a first storing device from the storing devices according to the first device type;
   (e) the heterogeneous storing server storing the file into the first storing device;
   (e2) the heterogeneous storing server dynamically adjusting a storing manner and a number of backups of the file according to a context of the file storing priority table;
   (f) the heterogeneous storing server retrieving at least one second device type of the first device type group;
   (g) the heterogeneous storing server selecting at least one second storing device from the storing devices according to the at least one second device type; and
   (h) the heterogeneous storing server copying the file to the at least one second storing device, wherein the number of the first storing device and the at least one second storing device is equal to the first group device count of the file storing priority table.

2. The file storing method as claimed in claim 1, wherein the heterogeneous storing server further connects with a file server, and the step (a) further comprises:
   (a1) the heterogeneous storing server receiving the file from the file server.

3. The file storing method as claimed in claim 1, wherein the file storing priority table further records a second device type group, a second group device attribute and a second group device count, and the second group device attribute and the second group device count are corresponding to the second device type group, the file storing method further comprising:
   (i) the heterogeneous storing server determining a second file attribute of the file after a time period;
   (j) the heterogeneous storing server determining that the second file attribute is consistent with the second group device attribute;
   (k) the heterogeneous storing server retrieving a third device type of the second device type group according to the result of the step (j);
   (l) the heterogeneous storing server selecting a third storing device from the storing devices according to the third device type;
   (m) the heterogeneous storing server storing the file into the third storing device;
   (n) the heterogeneous storing server retrieving at least one fourth device type from the second device type group;
   (o) the heterogeneous storing server selecting at least one fourth storing device from the storing devices according to the at least one fourth device type; and
   (p) the heterogeneous storing server copying the file to the at least one fourth storing device, wherein the number of the third storing device and the at least one fourth storing device is equal to the second group device count of the file storing priority table.

4. The file storing method as claimed in claim 1, wherein the file storing priority table further records a second device type group, a second group device attribute and a second group device count, and the second group device attribute and the second group device count are corresponding to the second device type group, the file storing method further comprising:
   (i) the heterogeneous storing server determining a second file attribute of the file after a time period;
   (j) the heterogeneous storing server determining that the second file attribute is consistent with the second group device attribute;
   (k) the heterogeneous storing server determining that the first device type of the first device type group is the same as a third device type of the second device type group;

(l) the heterogeneous storing server directly selecting the first storing device from the storing devices according to the result of the step (k);
(m) the heterogeneous storing server retrieving at least one fourth device type of the second device type group;
(n) the heterogeneous storing server selecting at least one fourth storing device from the storing devices according to the at least one fourth device type; and
(o) the heterogeneous storing server copying the file to the at least one fourth storing device, wherein the number of the first storing device and the at least one fourth storing device is equal to the second group device count of the file storing priority table.

5. The file storing method as claimed in claim 1, wherein the file storing priority table further records a second device type group, a second group device attribute and a second group device count, and the second group device attribute and the second group device count are corresponding to the second device type group, the at least one second device type further comprises a third device type, and the third device type corresponds to a third storing device among the storing devices, the file storing device further comprises:
(i) the heterogeneous storing server determining a second file attribute of the file after a time period;
(j) the heterogeneous storing server determining that the second file attribute is consistent with the second group device attribute;
(k) the heterogeneous storing server determining that the third device type of the first device type group is the same as a fourth device type of the second device type group;
(l) the heterogeneous storing server directly selecting the third storing device from the storing devices according to the result of the step (k);
(m) the heterogeneous storing server retrieving at least one fourth device type of the second device type group;
(n) the heterogeneous storing server selecting at least one fourth storing device from the storing devices according to the at least one fourth device type; and
(o) the heterogeneous storing server copying the file to the at least one fourth storing device, wherein the number of the third storing device and the at least one fourth storing device is equal to the second group device count of the file storing priority table.

6. The file storing method as claimed in claim 1, wherein the step (d) further comprises:
(d1) the heterogeneous storing server selecting the first storing device having a first priority level from the storing devices according to the first device type.

7. A heterogeneous storing server, comprising:
a connection interface, being configured to connect to a plurality of storing devices via a plurality of data nodes;
a storing unit, being configured to store a file storing priority table, wherein the file storing priority table records a first device type group, a first group device attribute and a first group device count, and the first device type group corresponds to the first group device attribute and a first group device count; and
a processing unit, being configured to:
retrieve a first file attribute of a file;
determine that the first file attribute of the file is consistent with the first group device attribute of the file storing priority table;
retrieve a first device type of the first device type group;
select a first storing device from the storing devices according to the first device type;
store the file into the first storing device;
dynamically adjust a storing manner and a number of backups of the file according to a context of the file storing priority table;
retrieve at least one second device type of the first device type group;
select at least one second storing device from the storing devices according to the at least one second device type; and
copy the file to the at least one second storing device, wherein the number of the first storing device and the at least one second storing device is equal to the first group device count of the file storing priority table.

8. The heterogeneous storing server as claimed in claim 7, wherein the connection interface is further configured to connect with a file server, and the processing unit is further configured to receive the file from the file server via the connection interface.

9. The heterogeneous storing server as claimed in claim 7, wherein the file storing priority table further records a second device type group, a second group device attribute and a second group device count, and the second group device attribute and the second group device count are corresponding to the second device type group, and the processing unit is further configured to:
determine a second file attribute of the file after a time period;
determine that the second file attribute is consistent with the second group device attribute;
retrieve a third device type of the second device type group;
select a third storing device from the storing devices according to the third device type;
store the file into the third storing device;
retrieve at least one fourth device type from the second device type group;
select at least one fourth storing device from the storing devices according to the at least one fourth device type; and
copy the file to the at least one fourth storing device, wherein the number of the third storing device and the at least one fourth storing device is equal to the second group device count of the file storing priority table.

10. The heterogeneous storing server as claimed in claim 7, wherein the file storing priority table further records a second device type group, a second group device attribute and a second group device count, and the second group device attribute and the second group device count are corresponding to the second device type group, and the processing unit is further configured to:
determine a second file attribute of the file after a time period;
determine that the second file attribute is consistent with the second group device attribute;
determine that the first device type of the first device type group is the same as a third device type of the second device type group;
directly select the first storing device from the storing devices;
retrieve at least one fourth device type of the second device type group;
select at least one fourth storing device from the storing devices according to the at least one fourth device type; and
copy the file to the at least one fourth storing device, wherein the number of the first storing device and the at least one fourth storing device is equal to the second group device count of the file storing priority table.

11. The heterogeneous storing server as claimed in claim 7, wherein the file storing priority table further records a second device type group, a second group device attribute and a second group device count, and the second group device attribute and the second group device count are corresponding to the second device type group, the at least one second device type further comprises a third device type, and the third device type corresponds to a third storing device among the storing devices, and the processing unit is further configured to:

determine a second file attribute of the file after a time period;

determine that the second file attribute is consistent with the second group device attribute;

determine that the third device type of the first device type group is the same as a fourth device type of the second device type group;

directly select the third storing device from the storing devices;

retrieve at least one fourth device type of the second device type group;

select at least one fourth storing device from the storing devices according to the at least one fourth device type; and copy the file to the at least one fourth storing device, wherein the number of the third storing device and the at least one fourth storing device is equal to the second group device count of the file storing priority table.

12. The heterogeneous storing server as claimed in claim 7, wherein the processing unit is further configured to select the first storing device having a first priority level from the storing devices according to the first device type.

\* \* \* \* \*